United States Patent Office 3,546,303
Patented Dec. 8, 1970

3,546,303
OXIDATION OF CYCLOALKANES
Paul Hornberger, Hermann Suessenguth, and Heinrich Tritschler, Ludwigshafen (Rhine), Germany, assignors to Badische Anilin- & Soda-Fabrik Aktiengesellschaft, Ludwigshafen (Rhine), Germany
No Drawing. Filed Dec. 28, 1966, Ser. No. 610,210
Claims priority, application Germany, Jan. 7, 1966, 1,568,064
Int. Cl. C07c 35/08
U.S. Cl. 260—631     3 Claims

ABSTRACT OF THE DISCLOSURE

A process for the continuous oxidation of cycloalkanes in liquid phase at elevated temperature and under pressure in which a current of oxygen (air), or the liquid hydrocarbon or an auxiliary solvent, is introduced in the lower portion of the oxidation zone and directed either along the bottom of the vessel or against the bottom and the adjacent wall, so that any solids which are present or which form during the reaction are kept in motion. The oxidation products are valuable intermediates, e.g. for the production of polymers of the polyamide type.

---

This invention relates to the oxidation of cycloalkanes, especially cyclohexane, with oxygen, e.g. in the form of air.

German Patent 940,649 describes a method of distributing gases in liquids in which an auxiliary liquid is injected by means of the gas through slot-type openings into the liquid flowing through a vessel, in a direction substantially perpendicular to the direction of flow. Moreover it is known that to produce forced circulation in a reactor a circulation pipe may be used, i.e. a pipe which is open at both ends and is arranged concentrically in the reactor. Reactors provided with circulation pipes are suitable for the oxidation of hydrocarbons, e.g. cyclohexane, with air using the said gas distribution processes. The gas or gas-liquid distributing means have hitherto been arranged relatively high above the bottom of the reaction vessel and in the lower opening of the circulation pipe. The liquid to be oxidized was supplied at the bottom of the reactor without any special distributing means. A disadvantage of these processes is that oily or solid products separate in the lower portion of the reaction vessel below the gas-liquid nozzle. These are deposited in the reaction chamber, cause disturbances and reduce the reaction space so that they have to be removed from time to time.

It is an object of the present invention to provide a process for the oxidation of cycloalkanes in which solid deposits do not occur in the lower portion of the reaction vessel. Another object of the invention is to provide a process for the oxidation of cycloalkanes which can be carried out continuously for long periods without interruption. A further object of the invention is to increase the space/time yield of oxidation products in the oxidation of cycloalkanes. These and other objects and advantages of the invention will be better understood from the following detailed description.

We have found that in the continuous oxidation of cycloalkanes in liquid phase at elevated temperature and superatmospheric pressure and in the presence of catalysts by distributing oxygen or a gas containing oxygen in molecular form, if desired together with an auxiliary liquid, preferably the hydrocarbon to be oxidized, and by producing an internal circulation within the reaction vessel by means of a circulation pipe the said disadvantages can be avoided by introducing at least some of the gas and/or liquid in the lower portion of the oxidation chamber in such a way that the flow is directed along the bottom of the reaction vessel or against the bottom and the adjacent wall, the products separating in the liquid during the reaction and any catalyst thus being kept in motion.

The oxidation conditions for cycloalkanes, especially those having from 5 to 12 carbon atoms in the ring, are known. For example, the oxidation of cyclohexane is carried out in liquid phase at 100° to 180° C. at a pressure of 2 to 50 atmospheres with oxygen or gases containing oxygen in molecular form, e.g. air containing 20 vol. percent of oxygen or air which has been enriched with oxygen or diluted with an inert gas such as nitrogen, the process if desired comprising a plurality of steps with or without intermediate washing steps. The oxidation is usually carried out in the presence of catalytic amounts, e.g. up to 100 p.p.m., of heavy metal catalysts, e.g. cobalt naphthenate. Other catalysts described in the literature may however also be used. Other cycloalkanes, e.g. cyclooctane or cyclododecane, may be oxidized in a similar manner and under similar conventional conditions. An oxidation mixture is obtained which in addition to containing unreacted cycloalkane consists mainly of the cycloalkanol and cycloalkanone. The ratio of cycloalkanol to cyclooctanone varies within wide limits according to the conditions applied, usually from 60:40 to 90:10. The ratio of cycloalkanol/cycloalkanone to cycloalkane depends on the degree of conversion chosen or desired. It is considerably above 3%, preferably between 5 and 10%, and in some conventional processes up to as much as 25%. The reaction mixture is worked up in conventional manner by the method desired, no claim being made herein to the method of working up.

The oxygen or gas containing oxygen may for example be introduced, as described above, through slot-type nozzles which direct the gas and any auxiliary liquid toward the bottom or along the bottom of the reaction chamber. It is preferred to introduce the gas and auxiliary liquid into the reaction chamber through the same inlet tube. The desired direction of flow of the current of gas, or gas and liquid, is most simply achieved by introducing it through a tube which is wholly or partly closed at its upper end and directing the oxidizing gas, if desired together with the auxiliary liquid, through lateral slots or holes along or toward the bottom of the oxidation vessel. By "directing along or toward the bottom" we means that the energy of flow is sufficient to produce flow of the contents of the reaction vessel along the bottom of the vessel. Alternatively, the oxidizing gas or the current of gas and liquid may be introduced through a plurality of inlet tubes which may be arranged eccentrically in the reaction chamber and have openings in the direction toward the lateral walls or along the lateral walls of the oxidation chamber and/or in the direction toward the bottom of the reaction chamber. As in conventional processes, the gas stream may also be introduced relatively high above the bottom of the reaction tube. In this case, the flow along the bottom is produced by means of the auxiliary liquid, preferably the hydrocarbon to be oxidized, by introducing it in accordance with this invention substantially as described above for the gas or gas-liquid stream. Whereas, in order to achieve intense circulation, the gas or gas-liquid outlet of the inlet tube or tubes has hitherto been arranged high above the bottom of the reaction vessel, i.e. near or within the lower open end of the circulation pipe, the gas and/or liquid is introduced in accordance with this invention into the lower portion of the reaction chamber and in such a way that any solid particles are kept in motion. This is conveniently achieved by arranging the outlets for the gas and/or liquid in the reaction chamber not higher than half the diameter of the reaction chamber, or preferably even lower, for example one tenth of the diameter of the reaction chamber above the bottom thereof.

In the case of radial flow of the gas and/or liquid along the bottom toward the walls of the reaction chamber, a liquid circulation occurs in the reaction tube, the liquid in the hollow cylinder between the external wall and the coaxial hollow cylinder flowing upwardly and the downward flow occurring through the coaxial hollow cylinder. If the gas and/or liquid is passed along or toward the bottom, or to the lateral wall of the reaction vessel in such a way that after the flow has been reflected the gas and/or liquid flow toward the center of the oxidation tube, the liquid and gas inside the coaxial hollow cylinder flow upwardly, whereas the downward movement takes place between the reactor walls and the inner circulation pipe. Circulation may be promoted by baffles.

In oxidation vessels as used in commercial plant, i.e. vessels several meters high, clouds of bubbles of uniform size are formed at a certain level, usually 1 to 2 meters above the point of introduction, as the gas is pumped in, independently of the size of the outlet openings, i.e. small bubbles combine to form larger ones and large bubbles split up into smaller ones.

It is expedient to remove from the lower portion of the oxidation chamber, either intermittently or continuously, a small amount, preferably up to 3 vol. percent, especially 1 vol. percent, of the liquid supplied together with any suspended material to prevent any build-up of the latter.

The hydrocarbon to be oxidized is supplied in conventional manner, provided at least some of the gas is introduced by the method according to this invention. Some of the oxidizing gas may be conventionally supplied to the reaction chamber at some other point, e.g. in the upper half. Conversely, the gas may be introduced conventionally provided the liquid is supplied by the method of the invention. Although the process may be carried out with auxiliary liquids of various kinds, e.g. liquids that do not take part in the reaction, it is preferred to use the hydrocarbon used in the process as the auxiliary liquid for the gas supply.

The invention is further illustrated by the following example in which parts by weight bear the same relation to parts by volume as the kilogram to the liter (S.T.P.).

EXAMPLE

A vertically arranged reaction vessel is used whose ratio of diameter to height is approximately 1:6 and whose lower end is tapered and closed by a cover. Inside the vessel a pipe is coaxially arranged whose diameter is approximately 70% of the diameter of the reaction vessel. The distance from lower end of the said pipe to the bottom cover is equal to the diameter of the latter. Two concentric tubes project through the middle of the bottom cover into the reaction vessel for approximately one-tenth of the diameter of the vessel. The tubes are closed at the upper ends. The outer tube, through which the liquid is supplied, has lateral slots through which the cyclohexane is fed together with the air supplied through the inner tube. The cyclohexane and air are supplied at the rate of 17 parts by weight per hour and 700 parts by volume per hour (S.T.P) respectively. The flow of the reactants is directed along the wall of the reaction vessel toward the wall of the oxidation chamber, is reflected by the wall and then rises through the inner coaxial pipe. The liquid flows down again in the space between the reactor walls and the coaxial pipe. 0.2 part by weight per hour is withdrawn from the bottom of the vessel together with any solids contained therein. The cyclohexane is oxidized in the reaction vessel at 140° to 145° C. at a pressure of 14 atm. gauge in the presence of 0.5 p.p.m. of cobalt to form an oil-soluble salt. The reaction product is withdrawn and worked up in conventional manner, either by supplying it to a further oxidation step or by distilling it in conventional manner. After twelve months' operation the reaction vessel is free from deposits of any kind, even in the lower portion.

If the gas inlet tube described is inserted up to a height equal to about 0.6 times the diameter of the reaction vessel and the same amount of liquid is withdrawn per hour, the wall of the vessel is incrusted after the same period. 1.42 parts by weights of solids has to be removed from the vessel. The heat exchangers and separators are also fouled.

We claim:
1. In a process for the continuous oxidation of a cycloalkane in liquid phase at elevated temperature and in the presence of a catalyst by distributing in the liquid medium a gas containing oxygen in molecular form and by producing an internal circulation of said liquid reaction medium by means of a circulation pipe open at both ends and arranged concentrically within the reaction vessel, the improvement which comprises introducing said gas containing oxygen laterally into the lower portion of the reaction vessel at a distance from the bottom of said vessel not higher than half the diameter of said vessel, and directing the introduced gas to flow along the bottom of the vessel with sufficient force to maintain solid particles in motion in the liquid medium.

2. A process as claimed in claim 1 wherein said gas containing oxygen is introduced through lateral openings of a concentric supply tube projecting upwardly from the bottom of the vessel and being closed at its upper end, thereby directing the introduced gas laterally and radially outwardly along the bottom of the vessel.

3. A process as claimed in claim 1 wherein the cycloalkane is cyclohexane.

References Cited

UNITED STATES PATENTS

| 2,616,898 | 11/1952 | Keith | 260—451 |
| 2,938,924 | 5/1960 | Simon et al. | 260—631 |

FOREIGN PATENTS

| 1,202,738 | 7/1959 | France | 260—586 |
| 139,041 | 1961 | U.S.S.R. | 260—451 |
| 852,523 | 10/1960 | Great Britain | 260—586 |

LEON ZITVER, Primary Examiner

M. W. GLYNN, Assistant Examiner

U.S. Cl. X.R.

260—586, 617, 687